United States Patent
Yang et al.

(10) Patent No.: US 9,696,010 B2
(45) Date of Patent: Jul. 4, 2017

(54) PHOSPHOR LAYER, COMPONENT, CORRESPONDING LIGHT SOURCE, PROJECTION SYSTEM AND CORRESPONDING MANUFACTURING METHOD

(75) Inventors: Yi Yang, Shenzhen (CN); Yi Li, Pleasanton, CA (US); Huai Tang, Shenzhen (CN); Xiliang Wu, Shenzhen (CN)

(73) Assignee: APPOTRONICS (CHINA) CORPORATION, Shenzhen (CN)

( * ) Notice: Subject to any disclaimer, the term of this patent is extended or adjusted under 35 U.S.C. 154(b) by 593 days.

(21) Appl. No.: 14/122,628

(22) PCT Filed: May 4, 2012

(86) PCT No.: PCT/CN2012/075061
§ 371 (c)(1),
(2), (4) Date: Nov. 26, 2013

(87) PCT Pub. No.: WO2013/000337
PCT Pub. Date: Jan. 3, 2013

(65) Prior Publication Data
US 2014/0111776 A1    Apr. 24, 2014

(30) Foreign Application Priority Data
Jun. 27, 2011  (CN) .......................... 2011 1 0175052

(51) Int. Cl.
*G03B 21/20*  (2006.01)
*F21V 9/10*   (2006.01)
(Continued)

(52) U.S. Cl.
CPC ................ *F21V 9/10* (2013.01); *C09K 11/02* (2013.01); *F21V 9/16* (2013.01); *G03B 21/204* (2013.01);
(Continued)

(58) Field of Classification Search
None
See application file for complete search history.

(56) References Cited

U.S. PATENT DOCUMENTS 3,014,813 A * 12/1961 Bouchard .............. H05B 33/20
427/66
7,547,114 B2 *  6/2009 Li .......................... G03B 33/06
353/20
(Continued)

FOREIGN PATENT DOCUMENTS

CN        101539270 A     9/2009
CN        101943374       1/2011
(Continued)

OTHER PUBLICATIONS

International Search Report in the parent PCT application No. PCT/CN2012/075061, dated Jun. 28, 2012.
(Continued)

*Primary Examiner* — Alexandre Ferre
(74) *Attorney, Agent, or Firm* — Chen Yoshimura LLP

(57) ABSTRACT

A phosphor layer comprising a phosphor plate adhesively formed by a phosphor powder and an adhesive agent. The phosphor plate has a front side and a back side. The phosphor layer also have particles which are fixedly connected to the front and/or back side of the phosphor plate. Also provided in the present invention are a phosphor component, a corresponding light source, a projection system, and a method for manufacturing the phosphor layer. The phosphor component prevents adhesion between the phosphor plate and substrates thereof in high temperature conditions.

10 Claims, 5 Drawing Sheets

(51) Int. Cl.
*F21V 9/16* (2006.01)
*C09K 11/02* (2006.01)

(52) U.S. Cl.
CPC .................. *Y10T 428/24372* (2015.01); *Y10T 428/24413* (2015.01); *Y10T 428/24909* (2015.01)

(56) References Cited

U.S. PATENT DOCUMENTS

| | | |
|---|---|---|
| 7,605,380 B2 | 10/2009 | Maeda et al. |
| 2004/0166234 A1 | 8/2004 | Chua et al. |
| 2008/0292060 A1 | 11/2008 | Leblans et al. |
| 2009/0001285 A1 | 1/2009 | Maeda et al. |
| 2010/0061077 A1* | 3/2010 | Winkler ............. C09K 11/7774 362/84 |
| 2011/0002140 A1* | 1/2011 | Tsukahara ............ G02B 5/0236 362/602 |

FOREIGN PATENT DOCUMENTS

| | | |
|---|---|---|
| CN | 101539270 | 6/2011 |
| EP | 1939892 | 7/2008 |
| EP | 1947653 | 7/2008 |
| JP | 2003-207599 | 7/2003 |
| JP | 2011-154168 | 8/2011 |

OTHER PUBLICATIONS

IPRP in the parent PCT application No. PCT/CN2012/075061, dated Jan. 7, 2014.
Extended European Search Report in counterpart application EP 12804869.1, dated Mar. 30, 2015.

\* cited by examiner

PHOSPHOR LAYER, COMPONENT, CORRESPONDING LIGHT SOURCE, PROJECTION SYSTEM AND CORRESPONDING MANUFACTURING METHOD

FIELD OF THE INVENTION

This invention relates to wavelength conversion lighting under excitation, and in particular, it relates to a phosphor layer, component, corresponding light source, projection system and corresponding manufacturing method.

DESCRIPTION OF THE RELATED ART

U.S. Pat. No. 7,547,114 provides a method of generating high brightness time sequential color lights. In this method, the excitation light emitted from an excitation light source is collected and focused on a phosphor wheel to excite phosphor material, which periodically emits time sequential color lights while the wheel is rotating. In this method, the phosphor wheel is a key component, which directly influences the brightness of the light source. It is disclosed in this patent that the phosphor layer is attached to a transparent substrate, which also may be a dichroic filter used to transmit excitation light and reflect converted light to improve the brightness of the light source. In Chinese patent 200810065895 a further study of the phosphor wheel structure shows that there should be a medium layer of low refraction index between the phosphor layer and its substrate, and the air is the best choice of the medium. That means that there is an air gap layer between the phosphor layer and its substrate, and the thickness of the air gap layer is limited in this patent. The study shows that the brightness of the light source becomes higher when the thickness of the air gap layer becomes thinner.

To generate the air gap and minimize its thickness, generally a sandwich liked structure is the only possible choice to use. Take reference of the FIG. 1. In FIG. 1, there are two substrates (1, 2) and a phosphor layer 3 which is set between the two substrates mentioned above. In the three layers of the sandwich liked structure shown in FIG. 1, the phosphor layer 3 is sandwiched from both sides by the two substrates (1, 2) (at least one of them is a transparent substrate), and if the phosphor layer 3 is in touch with but not adhere to the substrates, there are tiny air gaps between the adjacent layers, then the technical requirement is satisfied.

However, it is difficult to manufacture the phosphor layer. Generally, phosphor material is in the form of powders, i.e. phosphor powders, and there is no adhesive force between phosphor particles, or the adhesive force is too weak to form a layer shape, so an adhesive agent is needed to form a phosphor layer. In a fluorescent lamp metallic oxide such as alumina is used to fix the phosphors onto the inside surface of the fluorescent lamp to form a thin layer. This technology can be used to form a phosphor layer on a surface of a flat glass plate, but the phosphor layer is hard to be peeled off, so the phosphor layer must be used with the support of the glass substrate. Obviously this method cannot meet the requirement mentioned above that the phosphor layer does not adhere to the substrate (there is air gap between the phosphor layer and the substrate).

To form a phosphor layer without substrate, an adhesive agent of a certain strength must be used to fix the phosphors to form a film. Adhesive agents can be classified as organic adhesive agents and inorganic adhesive agents by adhesive characteristic. Organic adhesive agents could be some materials which are easy to operate such as silicone or epoxy, and inorganic adhesive agents could be metallic oxide which is mixed with phosphors to form a ceramic under high temperature and high pressure process. The latter process is complicated and the cost is high, only a few companies over the world can make it currently. Also the kind of the phosphor used in this method is limited. Therefore, organic adhesive agents are the first choice to make the phosphor layer. In this method, the phosphors are mixed with the organic adhesive agent firstly, then a film is formed on a substrate by printing or extrusion molding, and then the film is peeled off from the substrate. This is a well known manufacturing method in this industry, so a detailed description is omitted here.

The chosen organic adhesive agent first needs to meet the requirement of stability. Due to the long-time illumination of high power excitation light and high temperature caused by the excited phosphor, generally epoxy cannot meet the requirement of stability, while silicone is a possible choice due to its stable silicon oxygen bond. To meet the requirement mentioned above that the phosphor layer does not adhere to its substrate, the hardness of the chosen organic adhesive agent must be sufficient, for example higher than Shore D40. But because the phosphor layer needs to be peeled off from the substrate, the chosen organic adhesive agent also must be quite flexible and not crisp. That means that the hardness of the chosen organic adhesive agent cannot be too high, for example it should be lower than Shore D85. Through a selection process an organic adhesive agent of suitable hardness can be selected to mix with phosphors before forming a film and curing. This film can be placed in the sandwich structure and not adhere to the two substrates on both sides.

However, as shown in FIG. 2, in practical use, caused by illumination of the excitation light and heating by the phosphor, the phosphor layer will expand to generate a stress force which make the phosphor layer 3 arch toward one side (such as the side of substrate 1), so the pressure between the phosphor layer 3 and the substrate 1 increases. Meanwhile under high temperature the organic adhesive agent softens and the hardness decreases. Under the effects of these two simultaneous effects, the phosphor layer 3 will adhere to the substrate 1 which is located on the arched side of the phosphor layer, and the adhesion results in significant brightness reduction of the light source.

SUMMARY OF THE INVENTION

The technical problem solved by the present invention is to provide a phosphor layer and component which does not adhere to its substrate in a high temperature condition, and a corresponding light source, a projection system and a corresponding manufacturing method.

To solve this technical problem the method used in the present invention includes, constructing a phosphor layer, which comprises a phosphor plate adhesively formed by a phosphor and an adhesive agent. The phosphor plate comprises a front side and a back side, and the phosphor layer also comprises at least one particle, which is fixedly connected to the front and/or back side of the phosphor plate.

In the phosphor layer of the present invention, the hardness of the particle is greater than or equal to Shore D75.

In the phosphor layer of the present invention, the particle is metallic oxide particle, mixed crystal particle or phosphor particle.

In the phosphor layer of the present invention, the thickness of the particle is less than that of the phosphor plate.

In the phosphor layer of the present invention, the thickness of the particle is greater than or equal to 0.1 micrometers and less than or equal to 50 micrometers.

In the phosphor layer of the present invention, the particle is adhered to the front and/or back side of the phosphor plate.

In the phosphor layer of the present invention, the at least one particle is uniformly distributed on the front and/or back side of the phosphor plate.

In the phosphor layer of the present invention, the adhesive agent is an organic adhesive agent.

The present invention also relates to a phosphor component, which comprises a first substrate, a second substrate and a phosphor layer, the phosphor layer is set onto the first substrate, and the second substrate is set onto the phosphor layer, and the phosphor layer is anyone of phosphor layers mentioned above.

The present invention also relates to a light source device, which comprises an excitation light source to generate an excitation light, and a color wheel which comprises at least one segment which is placed in the light path of the excitation light, wherein at least one segment in all segments has the phosphor component mentioned above.

The present invention also relates to a projection system, which comprises the light source device mentioned above.

The present invention also relates to a manufacturing method for a phosphor layer, which comprises:

Step A: forming a phosphor plate by adhesively fixing a phosphor by an adhesive agent, wherein the phosphor plate comprises a front side and a back side;

Step B: fixedly connecting at least one particle onto the front and/or back side of the phosphor plate.

In the manufacturing method for the phosphor layer in the present invention, the step B comprises a step of adhesively fixing the at least one particle on the front and back side of the phosphor plate uniformly.

In the manufacturing method of the phosphor layer in the present invention, step B comprises:

Placing the phosphor plate in a solution of a certain viscosity;

Distributing multiple particles in the solution above the phosphor plate, and the particles are deposited uniformly onto a surface of the phosphor plate after a certain time period.

In the manufacturing method of the phosphor layer in the present invention, step B is the step of uniformly spraying multiple particles onto the front and back sides of the phosphor plate by a spraying gun.

The manufacturing method of the phosphor layer in the present invention further comprises, before the step of uniformly spraying multiple particles onto the front and back side of the phosphor plate by a spraying gun, a step of charging the particles with a electrostatic charge, and grounding the phosphor plate or charging it with a electrostatic charge, wherein the electrostatic charge of the particles and the electrostatic charge of the phosphor plate have opposite polarities.

There are following advantages to achieve the phosphor layer, component, corresponding light source, projection system and corresponding manufacturing method of the present invention: because the phosphor layer comprises a phosphor plate, and there is at least one particle on the front or back side of the phosphor plate, when the phosphor plate of the phosphor layer deforms under high temperature, the particles of a certain hardness will be embedded into the deformed phosphor plate to release its stress of deformation. This helps to keep a distance between the phosphor plate and its substrate on the side where the particles are deposited, and the air gap between the phosphor plate and the substrate is maintained. This can prevent the phosphor layer from adhering to its substrate under high temperature.

DETAILED DESCRIPTION OF THE PREFERRED EMBODIMENTS

Preferred embodiments of the present invention are described with reference to the Figures.

Figure 1:
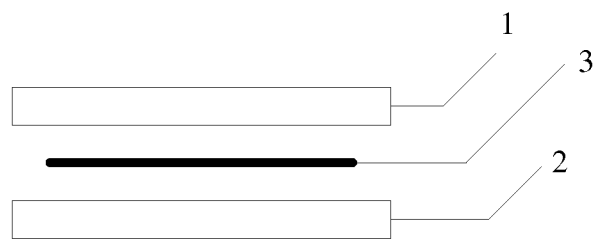
FIG. 1 is a schematic view of a structure of conventional phosphor material.
Figure 2:
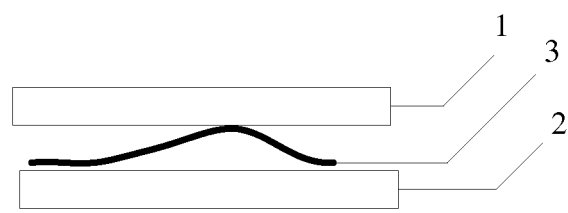
FIG. 2 is a schematic view showing a conventional phosphor plate deforms under high temperature and adheres to its substrate.
Figure 3:
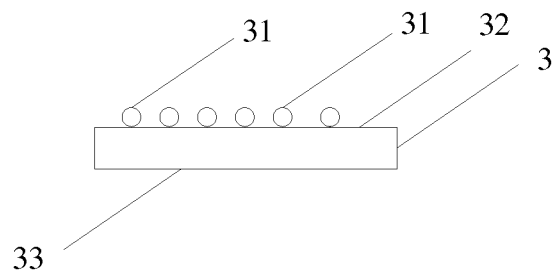
FIG. 3 is a schematic view of one embodiment of a phosphor layer in of the present invention.

Take reference to FIG. 3, FIG. 3 is a schematic view of one embodiment of a phosphor layer in the present invention. As shown in FIG. 3, in the embodiments of the phosphor layer, component, corresponding light source, projection system and corresponding manufacturing method, the phosphor layer comprises a phosphor plate 3 adhesively formed by a phosphor and an adhesive agent, the phosphor plate 3 having a front side 32 and a back side 33, and the phosphor layer also comprises at least one particle 31, which is fixedly connected to the front side 32 and/or the back side 33 of the phosphor plate 3. In FIG. 3, multiple particles 31 connected to the front side 32 of the phosphor plate 3 are shown.

In the present embodiment, to ensure that the phosphor plate 3 does not adhere to its substrate under high temperature, a key factor is that the particles 31 have a certain hardness, and it is preferred that the hardness is stable at high temperature, so that when the phosphor plate 3 deforms the particles can eliminate the stress caused by the deformation to prevent the adhesion of phosphor plate 3 to the substrate. Preferably, the hardness of the particles 31 is greater than or equal to Shore D75; the particles 31 are metallic oxide particles, mixed crystal particles or phosphor particles. Therefore, compared with the prior arts, when the phosphor plate 3 deforms under high temperature, by making use of the multiple particles 31 the present embodiment can prevent the problem of brightness reduction of the light source caused by the adhesion of the phosphor plate 3 to the substrate on the side of the phosphor layer (i.e. on the front side 32 of the phosphor plate 3 where the multiple particles 31 are provided).

Figure 4:
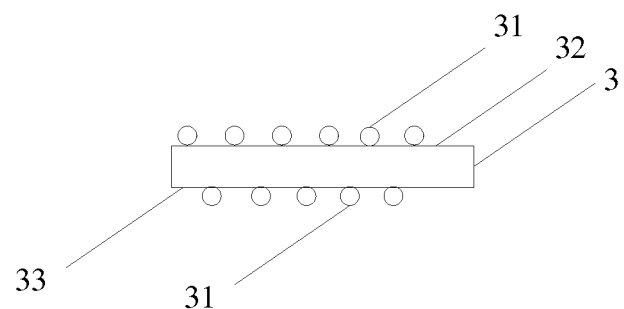
FIG. 4 is a schematic view of an alternative embodiment of a phosphor layer in the present invention.

Take reference to FIG. 4, FIG. 4 is a schematic view of an alternative embodiment of a phosphor layer in the present invention. Compared with the embodiment shown in FIG. 3 the difference of the present embodiment shown in FIG. 4 is: multiple particles 31 are adhered to the front side 32 and the back side 33 of the phosphor plate 3 to ensure that under high temperature, the phosphor plate 3 does not adhere to the respective substrates located near the front side 32 and the back side 33.

The existence of the particle 31 should not influence or should not significantly influence the lighting performance and light emitting brightness of the phosphor plate 3, so in the present embodiment, the thickness of the particle 31 is less than that of the phosphor plate 3. Preferably, the thickness of the particle 31 is greater than or equal to 10 micrometers and less than or equal to 20 micrometers. It is shown that this configuration can prevent the adhesion effect and eliminate the negative effect to the lighting performance of the phosphor plate 3 at the same time. Meanwhile, the particle 31 can perform a role of scattering the excitation light to increase the light conversion efficiency of the phosphor plate by reducing the excitation light power density on the phosphor plate.

It has been mentioned above that the particles 31 are adhered to the front side 32 and back side 33 of the phosphor plate 3, but the particles 31 can also be deposited only onto the front side 32 or the back side 33 of the phosphor plate 3 to reduce the complexity of the product. Preferably, as shown in FIG. 4, the particles are uniformly distributed on the front side 32 and/or the back side 33 of the phosphor plate to prevent the adhesion effect and meanwhile to reduce the negative effect on the lighting performance of the phosphor plate 3.

Furthermore, in view of cost and ease of operation, the adhesive agent used to adhesively fix the phosphors to form the phosphor plate 3 is preferably an organic adhesive agent.

Figure 5:
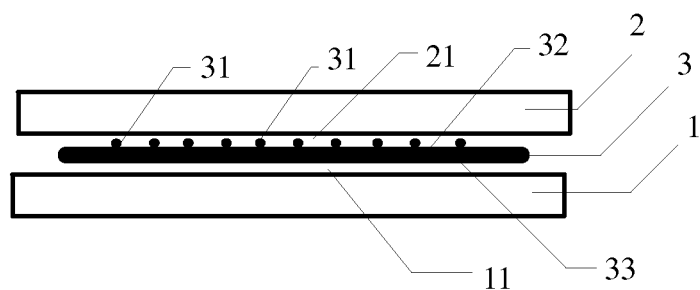
FIG. 5 is a schematic view of an embodiment of a phosphor component in the present invention.

Furthermore, the present embodiment also relates to a phosphor component. Take reference of FIG. 5, FIG. 5 is a schematic view of an embodiment of a phosphor component in the present invention. As shown in FIG. 5, the phosphor component comprises a phosphor layer, a first substrate 1 and a second substrate 2 which are set respectively on the upper side and lower side of the phosphor plate, wherein the phosphor layer is set onto the first substrate 1, and the second substrate 2 is set onto the phosphor layer. Between the phosphor layer and the first substrate 1 and between the phosphor layer and the second substrate 2, there are respectively a first air gap 11 and a second air gap 21. The phosphor layer comprises phosphor plate 3 and particles 31, phosphor plate 3 comprises an front side 32 and a back side 33 (i.e., the phosphor plate 3 is set between the first substrate 1 and the second substrate 2, and located near the surfaces of first substrate 1 and the second substrate 2 respectively), and the particles 31 are disposed on the front side 32 of the phosphor plate 3. The particles 31 are adhered to the front side of the phosphor plate 3, and they do not significantly change the thickness or the lighting performance of the phosphor plate 3.

Figure 6:
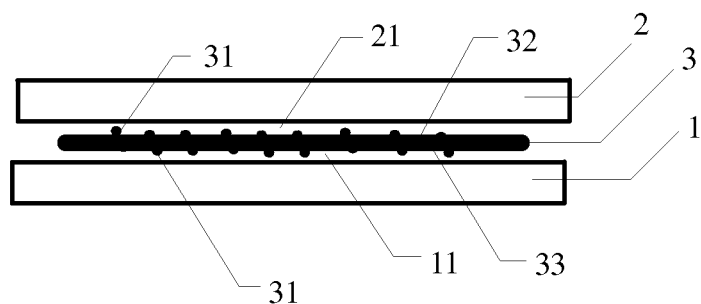
FIG. 6 is a schematic view of an alternative embodiment of the phosphor component in the present invention.

Take reference of FIG. 6, FIG. 6 is a schematic view of an alternative embodiment of the phosphor component in the present invention. In FIG. 6, the phosphor plate 3 of the phosphor component has multiple particles 31 which are uniformly distributed on the front side 32 and the back side 33 of the phosphor plate 3. This configuration (multiple particles 3 uniformly distributed on the front side 32 and the back side 33) can further prevent the adhesion of the phosphor plate 3 to the first substrate 1 and the second substrate 2, meanwhile the negative effect on the lighting performance of the phosphor plate 3 is small. The phosphor component using this configuration has the same advantages as discussed above.

In the phosphor components shown in FIG. 5 and FIG. 6, the particles 31 are inorganic particle, and have a hardness greater than Shore D75. Specifically, the particles 31 are silicon dioxide particles. In some alternative embodiments, the particles 31 may also be metallic oxide particles, mixed crystal particles or phosphor particles.

In the phosphor components of the embodiments show in FIG. 5 and FIG. 6, the diameter range of the particles is from 0.1 micrometers to 50 micrometers. The change of the lighting performance of the phosphor component is affected by two factors. The first is the thickness of the air gap which is located between the phosphor plate 3 and its substrates on the both sides caused by the particle 31; the brightness is reduced with increased thickness. The second is the distribution density $\rho$ of the particles 31 on the front or back side of the phosphor plate 3. When the particles 31 are phosphor particles, $\rho$ has little effect because the particles 31 will not block the light illumination. But when the particles 31 do not emit light, because the particles 31 themselves have blocking effect on light rays, the particles of larger $\rho$ will result in reduced brightness, while the particles having too small $\rho$ cannot prevent the adhesion effect. Specifically, this effect also depends on the size of the particles 31; the permitted particle density will be lower if the particle size is larger. The thickness of air gap is not completely decided by the particle size. Assume that during operation, the stress generated by the deformation of the phosphor plate 3 is F, the elasticity modulus of the phosphor plate 3 is E, then the vertical deformation is $d=F/E$; the diameter of particles should be greater than d to effectively prevent failure caused by the particles completely embedding into of the phosphor plate. Because of the possibility of the particle being embedded into the phosphor plate, the air gap is not necessarily larger with a larger particle size. The expansion coefficient of the organic material is a related factor as well. Generally, in the present embodiment, the particle size range is preferably from 10 micrometers to 20 micrometers, and the distribution density is preferably from 100 to 10000 particles per square millimeters.

Figure 7:
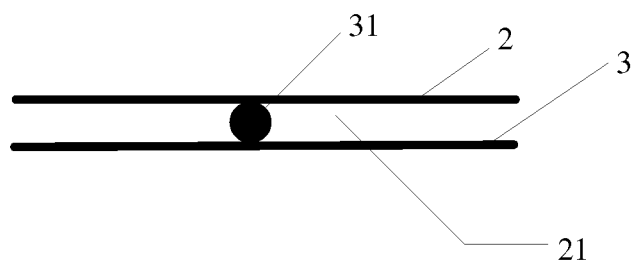
FIG. 7 is a schematic view of the locations of the phosphor plate and the substrate in an assembled phosphor component of the embodiment shown in FIG. 5.
Figure 8:
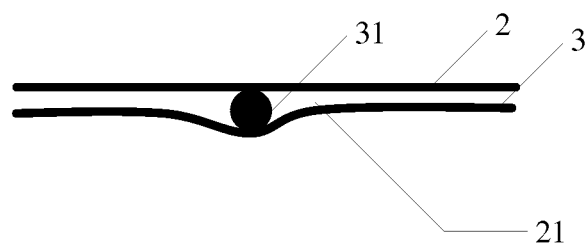
FIG. 8 is a schematic view of the locations of the phosphor plate and the substrate in a phosphor component of the embodiment shown in FIG. 5 under high temperature.
Figure 9:
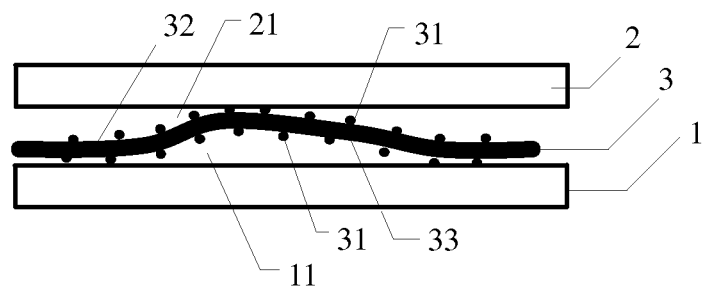
FIG. 9 is a schematic view of the structure of the phosphor component when the phosphor layer shown in FIG. 6 is under high temperature.

Take reference of FIG. 7, FIG. 7 is a schematic view of the locations of the phosphor plate and the substrate in an assembled phosphor component of the embodiment shown in FIG. 5. FIG. 7 shows one particle as an example to exemplarily illustrate the spatial relationship of the particle 31, the phosphor plate 3, the second substrate 2 and the second air gap 21 between the phosphor plate 3 and the second substrate 2 when the phosphor plate is not deformed due to high temperature. FIG. 8 is a schematic view of the locations of the phosphor plate and the substrate in a phosphor component of the embodiment shown in FIG. 5 under high temperature. FIG. 8 shows one particle as an example to exemplarily illustrate the spatial relationship of the particle 31, phosphor plate 3, the second substrate 2 and the second air gap 21 between the phosphor plate 3 and the second substrate 2 when the phosphor plate 3 is deformed under high temperature and the particle 31 is embedded into phosphor plate 3 to release the stress generated by the deformation. It can be seen in FIG. 8 that, although phosphor plate 3 deforms and the second air gap 21 between the phosphor plate 3 and the second substrate 2 becomes smaller, the second air gap 21 between the phosphor plate 3 and the second substrate 2 is still maintained due to the support of the particle 31, thereby preventing the adhesion effect. FIG. 9 is a schematic view of the structure of the phosphor component when the phosphor layer shown in FIG. 6 is under high temperature. FIG. 9 shows multiple particles 31 uniformly distributed on the front side 32 and back side 33 of the phosphor plate 3, and exemplarily illustrates the spatial relationship of the particles 31, phosphor plate 3, the first substrate 1, the second substrate 2, the first air gap 11 and the second air gap 21 when the phosphor plate 3 deforms under high temperature and the particles 31 are embedded in the phosphor plate 3 to release the stress generated by the deformation. It can be seen in FIG. 9 that, the first air gap 11 and the second air gap 21 still exist when the phosphor plate 3 deforms under high temperature due to the effect of the multiple particles 31.

The phosphor component described above can be used in a projection system. Take reference of FIG. 10, FIG. 10 is a schematic view of an embodiment of a projection system in the present invention.

Figure 10:
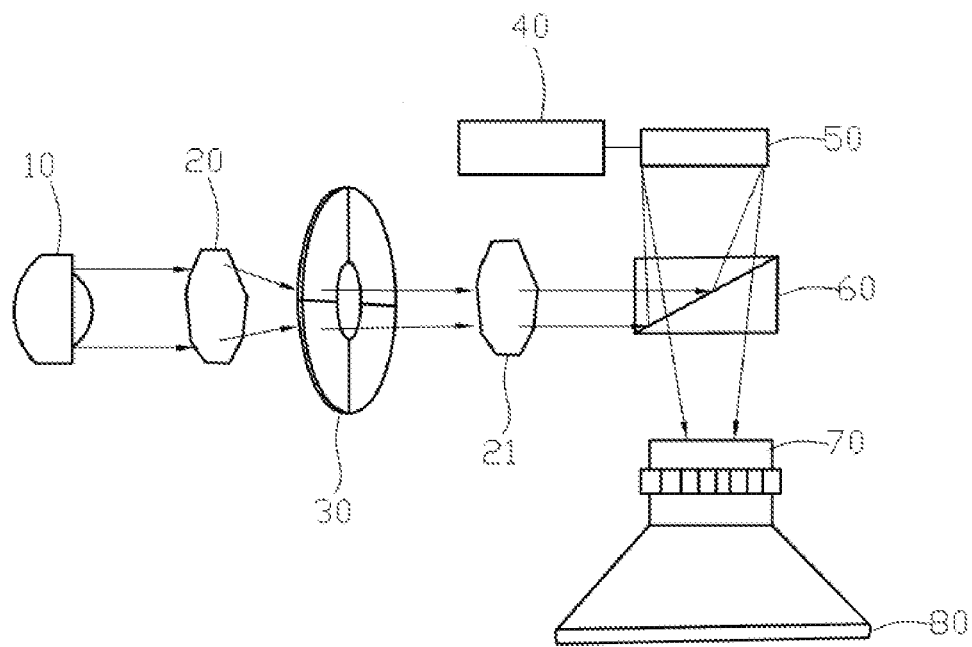
FIG. 10 is a schematic view of an embodiment of a projection system in the present invention.

As shown in FIG. 10, the projection system mainly comprises an excitation light source 10, a shape modification lens 20, a relay lens 21, a color wheel 30, a detection unit 40, a light modulation unit 50, a prism 60 and a projection lens 70.

The excitation light source 10 is used to generate an excitation light. The excitation light generated from the excitation light source is preferably shaped by the shape modification lens 20 or other optical components and incident onto the color wheel 30.

The color wheel 30 comprises at least two segments, each segment has a phosphor component described above with different wavelength conversion characteristics; or some of the segments have a phosphor component described above and at least one segment is a transparent segment.

For example, when the excitation light source is blue LED or blue laser, the color wheel comprises a first segment, a second segment and a third segment. The first segment and the second segment respectively have a red phosphor component and a green phosphor component, which can convert the blue light emitted from the excitation light source to red light and green light respectively. The third segment is a transparent segment with a diffusing plate which can transmit the blue light emitted from the excitation light source. When the segments of the color wheel 30 are driven by a motor (not shown in the figure) or other driving device to be sequentially located on the light path of the excitation light, the color wheel 30 will emit a periodical sequential color light which consists of red light, green light and blue light.

The sequential color light emitted from the color wheel 30 travels through the relay lens 21 and the prism 60 and enters the light modulation unit 50. The light modulation unit 50 can be many kinds of appropriate light modulation device such as micro electro-mechanical system (MEMS), liquid crystal display device (LCD or LCos) and so on. The light modulation unit 50 performs image modulation for the received first converted light and the excitation light based on a synchronization signal, so that the light modulation unit 50 and the color wheel 30 can work in synchrony. The light modulated by the light modulation unit 50 further enters in the projection lens 70, and then is projected by the projection lens 70 onto a screen 80.

It should be understood that, the color wheel can also comprise only one segment, which has the phosphor component as shown in the embodiment of FIG. 5 or FIG. 6. For example, the color wheel 30 comprises only a green phosphor component, and the red light and blue light are directly generated by a red LED and a blue LED respectively. The green light, red light and blue light are combined through a light combining device to form a combined light which is incident onto the light modulation unit.

A light source of the present embodiment may comprise a multi-color illumination device which consists of an excitation light source and a color wheel described above for emitting sequential color light.

Figure 11:
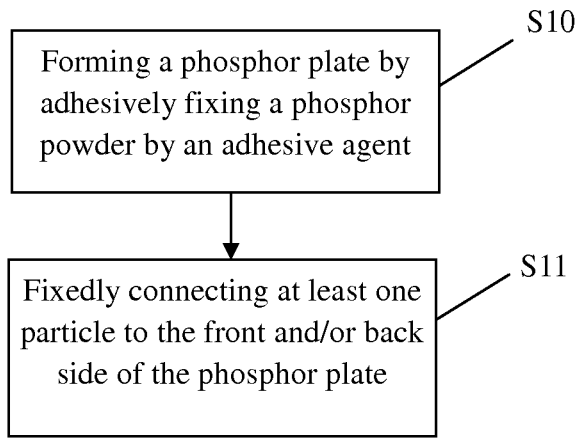
FIG. 11 is a flow chart of an embodiment of a manufacturing method of a phosphor layer in the present invention.

An embodiment of the present invention also relates to a manufacturing method of the phosphor layer described above. Take reference of FIG. 11, FIG. 11 is a flow chart of an embodiment of a manufacturing method of a phosphor layer in the present invention, comprising:

Step S10: forming a phosphor plate by adhesively fixing a phosphor by an adhesive agent;

The adhesive agent is preferably an organic adhesive agent. The technology of adhesively fixing the phosphor by the adhesive agent is a well known technology and is not described in detail here.

Step S11: fixedly connecting at least one particle to the front side and/or the back side of the phosphor plate.

To prevent the adhesion of the phosphor plate to its substrate under high temperature, a key factor is that the particle has a certain hardness, and it is preferred that the hardness is stable at high temperature, so that when the phosphor plate deforms the particle can eliminate the stress caused by the deformation to prevent the adhesion of the phosphor plate to the substrate. Preferably the hardness of the selected particle is greater than or equal to Shore D75, and the particle is preferably a metallic oxide particle, mixed crystal particle or phosphor particle.

The existence of the particle should not influence or significantly influence the lighting performance and light emitting brightness of the phosphor plate, so in the present embodiment, the thickness of the particle is preferably less than that of the phosphor plate 3. Furthermore, the thickness of the selected particle is preferably greater than or equal to 10 micrometers and less than or equal to 20 micrometers. It is shown that this configuration can prevent the adhesion effect and eliminate the negative effect to the lighting performance of the phosphor plate at the same time.

Adhesion or other connecting approach can be used to fixedly connect at least one particle to the front or/and the back side of the phosphor plate. At least one particle may be uniformly adhesively fixed to the front and the back side of the phosphor plate to get better performance.

In the present embodiment, because at least one particle is provided on the front or the back side or both sides of the phosphor plate, and the particle has a certain hardness, the air gap located between the phosphor plate and the substrate near the side where the particle is connected is maintained by the uniformly distributed particle when the phosphor plate deforms under high temperature. Meanwhile, the particle with an appropriate particle size will have no or an insignificant effect on the lighting performance of the phosphor layer.

Figure 12:
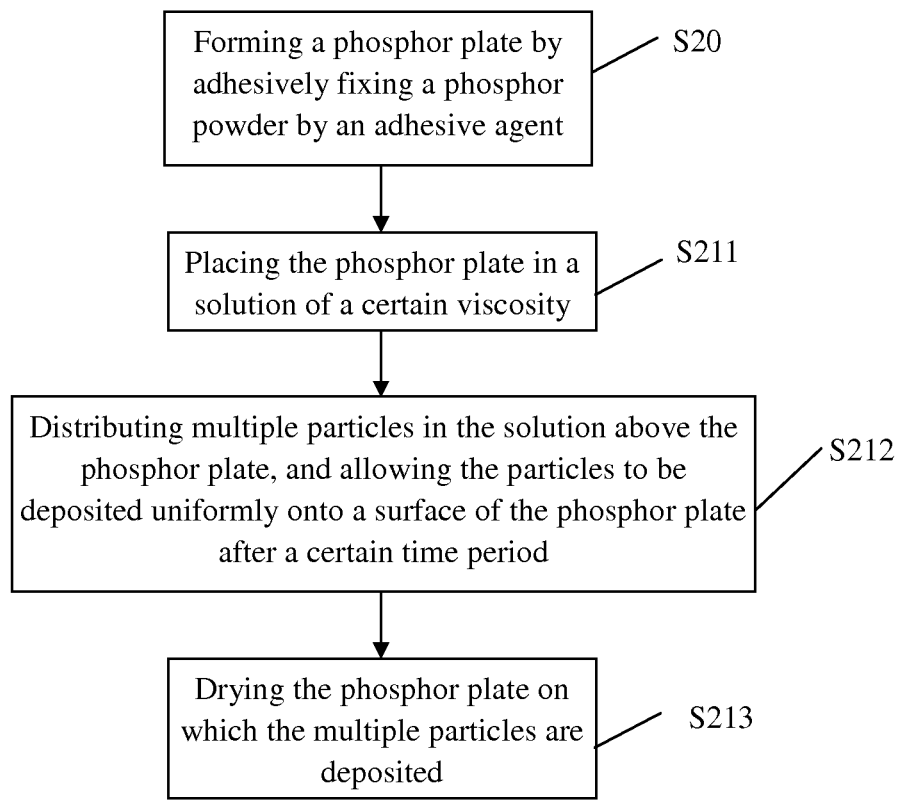
FIG. 12 is a flow chart of an alternative embodiment of the manufacturing method of a phosphor layer in the present invention.

Take reference of FIG. 12, FIG. 12 is a flow chart of an alternative embodiment of the manufacturing method of a phosphor layer in the present invention, comprising:

Step S20: forming a phosphor plate by adhesively fixing a phosphor by an adhesive agent;

For the description of step S20, refer to step S10.

Step S211: Placing the phosphor plate in a solution of a certain viscosity;

This liquid is volatile, and contains an organic medium which can increase the viscosity of the solution and reduce the settling speed of the particle in the solution, so that the settled particles in the solution are distributed uniformly.

In the present embodiment through the steps S211, S212 and S213 the particles are fixedly connected to the phosphor plate.

Step S212: Distributing multiple particles in the solution above the phosphor plate, so that the particles are deposited uniformly onto a surface of the phosphor plate after a certain time period;

In this step, the particles are distributed in the solution containing the organic medium mentioned above, i.e., the particles are distributed in the liquid with a certain distribution density. The particles settle in the solution and are uniformly distributed on the surface of the phosphor plate after a certain time period.

Step S213: drying the phosphor plate on which the multiple particles are deposited.

In this step, the phosphor plate on which the multiple particles are deposited is dried to evaporate the solution and the organic medium. Oven dry is a generally used method. This way, the particles in the solution will stay on the surface of the phosphor plate with uniform distribution and secure connection. The method used in this embodiment to connect the particles to the phosphor plate surface is a deposition method, i.e. the particles are dissolved in a solution, uniformly deposited on the phosphor plate surface and then dried. In this method, an organic medium may be added in the solution to increase the viscosity and reduce the settling speed of the particles, to improve the distribution uniformity of the particles. After deposition the phosphor plate is taken out of the solution and dried in an oven to remove the organic medium residue. Advantages of the deposition method are that the uniformity of the film is good, the amount of the particles is easy to control and the reproducibility is good.

Figure 13:
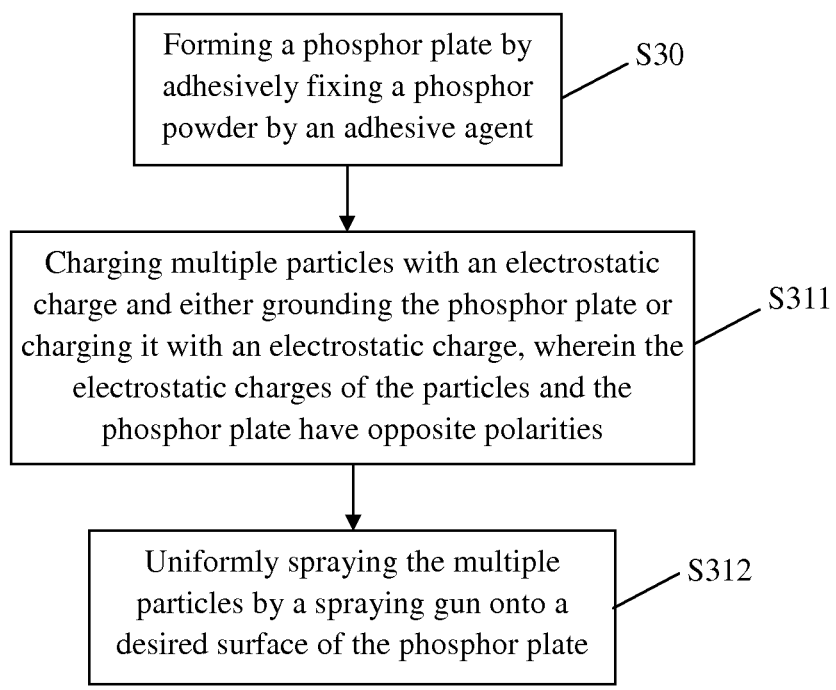
FIG. 13 is a flow chart of an alternative embodiment of the manufacturing method of a phosphor layer in the present invention.

Take reference of FIG. 13, FIG. 13 is a flow chart of an alternative embodiment of the manufacturing method of a phosphor layer in the present invention, comprising:

Step S30: forming a phosphor plate by adhesively fixing a phosphor by an adhesive agent;

For the description of step S30, refer to step S10.

In the present embodiment through the steps S311 and S312 the particles are fixedly connected to the phosphor plate.

Step S311: charging the particles with an electrostatic charge, and grounding the phosphor plate or charge it with an electrostatic charge, wherein the electrostatic charge carried by the particles and the phosphor plate have opposite polarities.

For example, charge the particles with negative electrostatic charge and ground the phosphor plate or charge it with positive electrostatic charge. The technology of charging the particles and the phosphor plate with opposite charges is a well known technology and not described in detail here.

Step S312: uniformly spraying multiple particles by a spraying gun onto the desired surface of the phosphor plate.

Using a spraying gun, these multiple powder-like particles with electrostatic charge can be directly sprayed onto the front or back side of the phosphor plate (i.e., the desired side can be the front or back side or both sides). These particles carry electrostatic charge before being sprayed by the spraying gun, so when they are sprayed onto a surface of the phosphor plate, these particles can firmly connect to the phosphor plate and well attached to the surface of the phosphor plate due to the effect of the electrostatic charge. The advantage of the powder spraying method is easy operation. Of course in some alternative embodiments, the particles are not charged to simplify the manufacturing process, but in this case the adhesion of the particles to the phosphor plate will be weaker.

In the present embodiment the method of connecting the particles to a surface of the phosphor plate is a powder spraying method, which directly sprays the particles on a phosphor plate surface by a spraying gun, and the particles adhere to the phosphor plate surface by the adhesive force of the phosphor plate itself. In this method, the particles and the phosphor plate can be electrically charged with opposite electrostatic charges during the spraying procedure, and the electrostatic force causes the particles to be distributed on the phosphor plate surface so that the adhesive force between the particles and the phosphor plate surface is increased and the distribution uniformity is improved.

In short, in the above embodiments, through the process of uniformly forming a particle or multiple particles of very high hardness (greater than Shore D75) on both sides of a already-formed phosphor plate, where the thickness of the particle layer is less than that of the phosphor plate, the particles have negligible effect on the lighting performance of the phosphor plate. The material of the particle is generally an inorganic material such as silicon dioxide particle, titanium dioxide particle and other metallic oxide particle, and so on, and also can be mixed crystal or non-crystal particles such as glass powder, and also can be phosphor particles. In operation, although a significant deformation stress is generated between the phosphor plate and the substrate by the expansion effect of the phosphor plate, and this stress will force the phosphor plate to press toward a substrate on one side, as shown in FIG. 7, FIG. 8 and FIG. 9, the air gaps between the phosphor plate 3 and its substrates (including the first substrate 1 and the second substrate 2) always exist due to the material and uniformity characteristics of the particles 31, so that the adhesion between the phosphor plate 3 and the substrates is prevented. FIG. 7 illustrates the spatial relationship of the phosphor plate 3, the particle 31 and the inner surface of second substrate 2, where a second air gap 21 is present. FIG. 8 schematically illustrates that the phosphor plate 3 deforms under stress and bulges toward the second substrate 2 and away from the first substrate 1, and the hard particle 31 is located between these two (the phosphor plate 3 and the second substrate 2), and the pressure generated from the deformation will make the hard particle 31 embed into the relatively flexible phosphor plate 3 to release the stress and meanwhile prevent the direct contact of the phosphor plate 3 and the second substrate 2 so that the adhesion is prevented and the existence of the second air gap 21 is maintained. FIG. 9 illustrates the deformation of the phosphor plate 3 when the multiple particles 31 are uniformly distributed on the front side 32 and the back side 33 of the phosphor plate 3.

It has been shown that, the phosphor layer and its manufacturing method in the present embodiment can effectively overcome the adhesion problem between organic gel-like phosphor layer and the substrate.

The above description only illustrates several embodiments of the present invention; the descriptions are detailed but do not limit the protection scope of the present invention. It is noted that to those of ordinary skill in the art, following the principle of the present invention some changes and improvements can be made, and the changes and improvements are also protected by the present invention. The protection scope of the present invention should be determined by the claims.

What is claimed is:

1. A phosphor component, comprising:
    a first substrate and a second substrate;
    a phosphor plate adhesively formed by a phosphor powder and an adhesive agent, wherein the phosphor plate is disposed between the first substrate and the second substrate and has a first side facing the first substrate and a second side facing the second substrate; and
    a plurality of particles, which are fixedly connected to the first side of the phosphor plate and disposed between the first side of the phosphor plate and the first substrate, wherein the particles maintain an air gap between the first side of the phosphor plate and the first substrate.

2. The phosphor component of claim 1, wherein the particles have a hardness greater than or equal to Shore D75.

3. The phosphor component of claim 1, wherein the particles are metallic oxide particles, mixed crystal particles or phosphor particle.

4. The phosphor component of claim 1, wherein a thickness of the particles is less than that of the phosphor plate.

5. The phosphor component of claim 4, wherein the thickness of the particles is greater than or equal to 0.1 micrometers and less than or equal to 50 micrometers.

6. The phosphor component of claim 1, wherein the particles are adhered to the front and/or the back side of the phosphor plate.

7. The phosphor component of claim 1, wherein the particles are uniformly distributed on the first side of the phosphor plate.

8. The phosphor component of claim 1, wherein the adhesive agent is an organic adhesive agent.

9. A light source device comprising the phosphor component of claim 1, further comprising:
    an excitation light source for generating an excitation light; and
    a color wheel which comprises at least one segment located on a light path of the excitation light, wherein at least one of the at least one segment has the phosphor component.

10. A projection system, comprising the light source device of claim 9.

* * * * *